(12) United States Patent
Barnes

(10) Patent No.: US 8,563,857 B2
(45) Date of Patent: Oct. 22, 2013

(54) OLD CONSTRUCTION BOX

(76) Inventor: Lloyd Barnes, West Valley City, UT (US)

( * ) Notice: Subject to any disclaimer, the term of this patent is extended or adjusted under 35 U.S.C. 154(b) by 246 days.

(21) Appl. No.: 12/967,698

(22) Filed: Dec. 14, 2010

(65) Prior Publication Data

US 2011/0147035 A1 Jun. 23, 2011

Related U.S. Application Data

(60) Provisional application No. 61/288,303, filed on Dec. 20, 2009.

(51) Int. Cl.
*H02G 3/08* (2006.01)
(52) U.S. Cl.
USPC .......... 174/58; 174/50; 174/64; 439/535; 248/906; 220/4.02

(58) Field of Classification Search
USPC .......... 174/50, 54, 55, 58, 64, 57; 220/4.02; 248/906; 439/535
See application file for complete search history.

(56) References Cited

U.S. PATENT DOCUMENTS

| 3,468,448 A | * | 9/1969 | Borucki et al. | 220/3.6 |
| 4,108,414 A | * | 8/1978 | Grant, Sr. | 248/300 |

* cited by examiner

*Primary Examiner* — Dhirubhai R Patel
(74) *Attorney, Agent, or Firm* — David R. Conklin; Kirton McConkie

(57) ABSTRACT

An old construction box that is combined with an adapter clip to securely anchor the construction box with an opening provided in a finished wall surface.

17 Claims, 5 Drawing Sheets

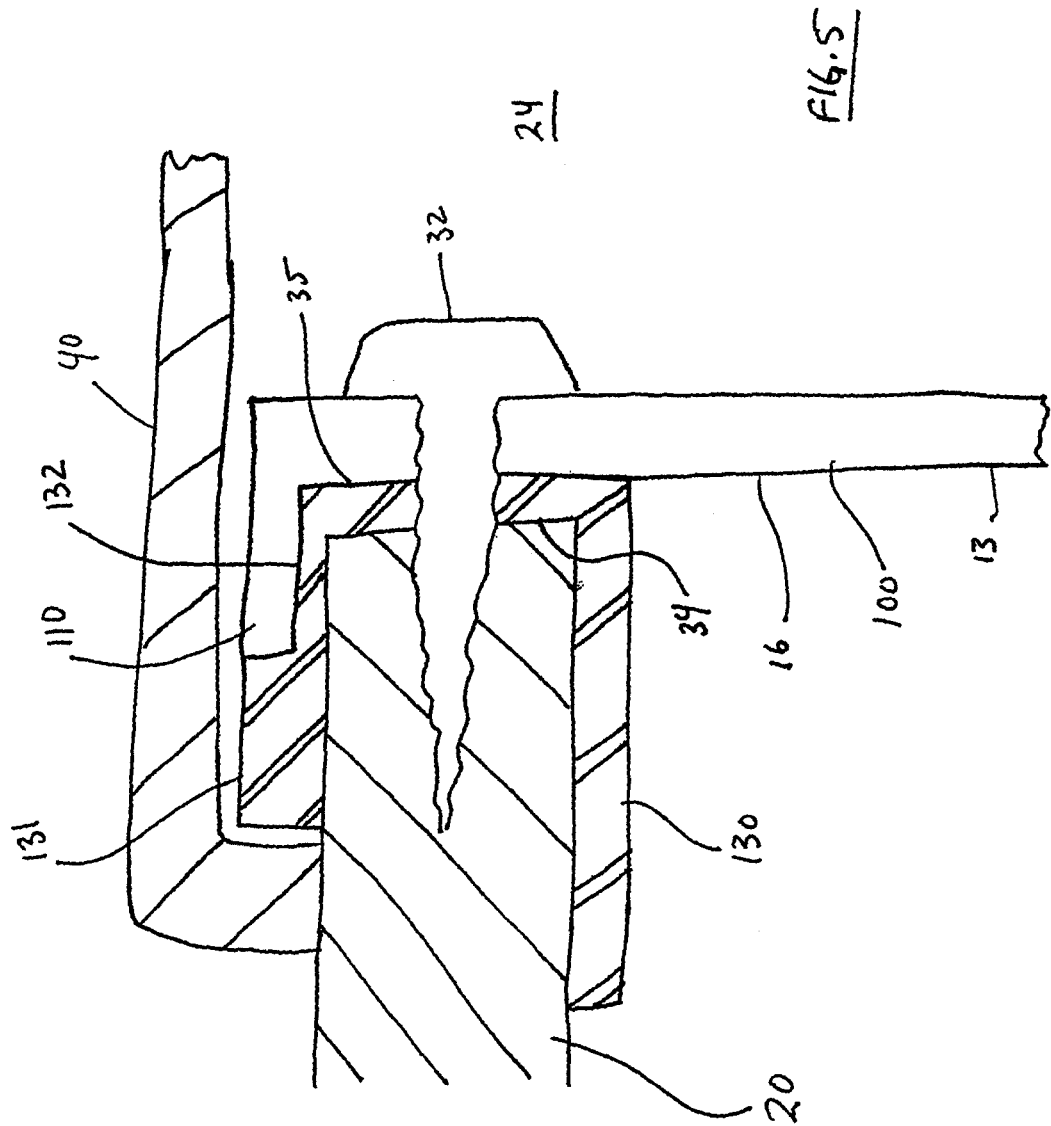

OLD CONSTRUCTION BOX

RELATED APPLICATIONS

The present application claims priority to U.S. Provisional Patent Application OLD CONSTRUCTION CUT IN BOX, Ser. No. 61/288,303, filed Dec. 20, 2009, which is incorporated herein in its entirety.

FIELD OF THE INVENTION

This invention relates to devices which enable consumers to provide electrical boxes in existing, finished walls and ceilings. In particular, the present invention relates to an old construction or old work box having features to enable quick installation without causing damage to the existing wall or ceiling surface.

BACKGROUND OF THE INVENTION

Old construction boxes, also called "old work boxes" are an electrical box, typically made from metal or plastic, which is used in remodeling applications. The box is used for high voltage applications, such as electrical switches, ceiling fans, and lighting, as well as low voltage applications, such as cables, audio/video wiring, and computer cords.

The old construction box is installed in an existing wall by first providing a hole in the wall. The hole is generally provided so as to maintain a close tolerance between the box and the perimeter of the hole. In some instances, a portion of the box is extended to provide flanges or ears, wherein the flanges increase the width or height of the box so as to prevent the box from being entirely inserted within the hole. In other instances, the old construction box further includes a set of folding tabs that are configured or bent by the user to secure the box within the hole. In some instances, the box further comprises a pair of retractable wings or clamps which are positioned inside the wall. After partial insertion of the box into the hole, the user retracts the wings against an inner surface of the wall to draw the flange portion of the box snug against an outer surface of the wall. In this way, the old construction box is secured within the hole without requiring attachment of the box to an adjacent stud within the wall. However, these securing methods or features reduce the volume of the old construction box, thereby limiting the number of wires that may be safely stored or spliced within the box.

In some instances, a user may desire to install an old construction box in conjunction with metal or plastic wire conduit located within the finished wall. To do this, the user must connect the conduit to the old construction box prior to inserting the box within the hole. The process of inserting the box and connected conduit within the hole requires the box and conduit to be manipulated into place. This process often results in unintended pressures being applied to the box, the conduit and the wall surface, thereby resulting in unwanted damage. Following placement of the box, the user must then repair the wall to complete the installation.

Thus, while technologies currently exist that are designed to install an electrical box in a finished wall or ceiling surface, challenges still exist. Accordingly, it would be an improvement in the art to augment or even replace current techniques with other techniques.

SUMMARY OF THE INVENTION

Some implementations of the present invention provide a flangeless old construction box which is coupled to an inner surface of a provided hole via fasteners and adapter clips. Further, in some implementations an old construction box is provided having lateral flanges, wherein the lateral flanges interact with adapter clips, and wherein the box is coupled to an inner surface of a provided hole via fasteners and the adapter clips. Further, in some implementations of the present invention a method for securing a fastener into a raw surface of a gypsum product is provided.

These and other features and advantages of the present invention will be set forth or will become more fully apparent in the description that follows. The features and advantages may be realized and obtained by means of the instruments and combinations provided herein. Furthermore, the features and advantages of the invention may be learned by the practice of the invention or will be obvious from the description, as set forth hereinafter.

BRIEF DESCRIPTION OF THE DRAWINGS

FIG. 5 is a detailed cross-section view of an installed old construction box in accordance with a representative embodiment of the present invention.

DETAILED DESCRIPTION OF THE INVENTION

The present invention relates to devices which enable consumers to provide electrical boxes in existing, finished walls and ceilings. In particular, the present invention relates to an old construction or old work box having features to enable quick installation without causing damage to the existing wall or ceiling surface.

Figure 1:
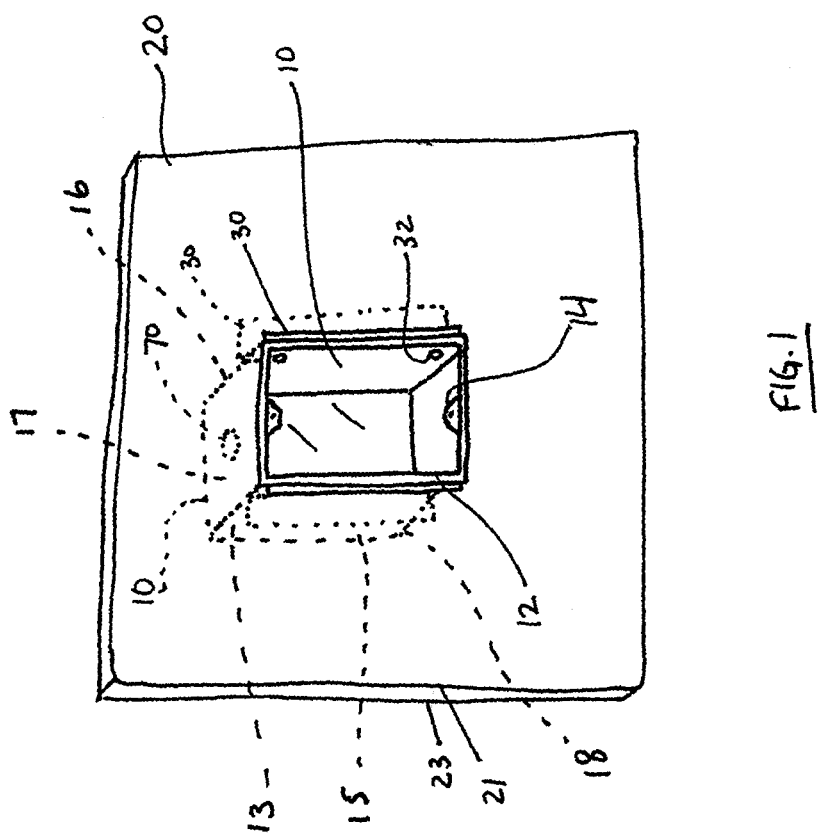
FIG. 1 is a perspective view of an installed old construction box in accordance with a representative embodiment of the present invention.
Figure 2:
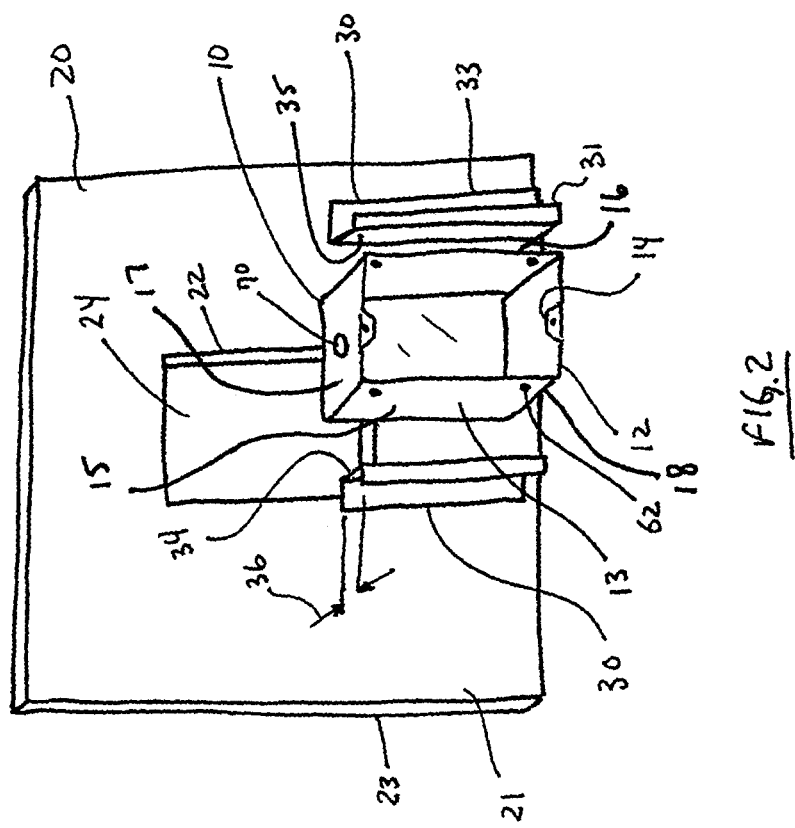
FIG. 2 is an exploded perspective view of an old construction box in accordance with a representative embodiment of the present invention.

Referring now to FIG. 1, an old construction box 10 is shown as installed in a finished wall surface 20. In some embodiments, wall surface 20 comprises at least one of a gypsum board material, a plaster material, a lathe and plaster material, a cement board material, a wood paneling material, a concrete material, a stucco coated wall surface, and combinations thereof. In some embodiments, construction box 10 comprises a box having an opening 12 for receiving and electrical component, such as a light switch or an electrical receptacle, and an outer surface 13 comprising a first side surface 15, a second side surface 16, a top surface 17 and a bottom surface 18. Opening 12 is defined by perimeter 50 and provides access to an interior 51 of box 10. In some embodiments, construction box 10 further comprises mounting tabs 14 positioned within opening 12., whereby mounting tabs 14 are provided to couple an electrical component to the construction box 10.

Construction box 10 may comprise any material compatible with installation of high and/or low voltage electrical wiring and components. For example, in some embodiments construction box 10 comprises at least one of plastic, metal, fiberglass, composite materials, and combinations thereof. Where construction box 10 is used for low voltage wiring and component applications, construction box 10 may comprise a low voltage gang box. In some embodiments, a low voltage gang box comprises a mounting bracket having a front opening and a rear opening to accommodate bending requirements of low voltage wires and cables.

Construction box 10 may comprise any shape, rigidity and/or size necessary to accommodate use for a desire application. For example, in some embodiment construction box 10 comprises a round ceiling box. In other embodiments, construction box 10 comprises a single gang box. Further, in other embodiments construction box 10 comprises a multi-gang box. Still further, in some embodiments construction box 10 comprises a rigid box for use in applications where harsh conditions or physical impact are likely to occur.

In some embodiments, the size, shape, color and material of construction box 10 is selected based on building code requirements of the location where the old construction box 10 is to be installed. Accordingly, one having skill in the art will appreciate that the features of the present invention may be modified as required to comply with regulations, codes, statutes and other governing rules for jurisdictions in which the construction box 10 is used.

Referring now to FIGS. 1-4, construction box 10 is secured to wall surface 20 via adapter clips 30 and a plurality of fasteners 32. In some embodiments, fasteners 32 comprise at least one of a screw, a metal framing screw, a wood screw, and a sheet rock screw. In some embodiments, adapter clips 30 comprise a channel 34 having a width 36 to compatibly receive an edge 22 of an opening 24 provided in wall surface 20. Adapter clip 30 further comprises a base surface 35 positioned opposite of channel 34 whereby adapter clip 30 forms an interface with outer surface 13 of construction box 10 via base surface 35. Adapter clip 30 may comprise any material compatible with installation of high and/or low voltage electrical wiring and components. For example, in some embodiments adapter clip 30 comprises a metallic material, such as aluminum or galvanized steel. In other embodiments, adapter clip 30 comprises another suitable material, such as plastic, fiberglass or a composite material.

In some embodiments, adapter clips 30 further comprises a front flange 31 and a rear flange 33. Front flange 31 is configured to wrap around a front or exterior surface 21 of wall surface 20, while rear flange 33 is configured to wrap around a rear or interior surface 23 of wall surface 20. Thus, adapter clip 30 provides a protective covering over the portion of edge surface 22 which is positioned within channel 34 of the clip.

In some embodiments, front flange 31 of adapter clip 30 comprises a minimal width 50 to permit concealment of clip 30 by a cover plate 40. Further, in some embodiments rear flange 33 of adapter clip 30 comprises an extended width 52 to increase the surface area of interface between adapter clip 30 and wall surface 20. By increasing the surface area of interface between adapter clip 30 and wall surface 20, the installed construction box 10 is more securely anchored within opening 24. In some embodiments, adapter clip 30 further comprises a length 54 which is approximately equal to a length or width of opening 24. In other embodiments, adapter clip 30 comprises a length 54 which is less than a length or width of opening 24. In some embodiments, construction box 10 is installed in opening 24 with a pair of oppositely positioned adapter clips 30. In other embodiments, construction box 10 is installed in opening 24 with more than two adapter clips 30. Further, in some embodiments construction box 10 is installed in opening 24 with a single adapter clip 30, wherein the single adapter clip 30 contacts at least two adjacent sides 15 and 16 of construction box 10. Further still, in some embodiments construction box 10 is installed in opening 24 with a single adapter clip 30, wherein the single adapter clip 30 contacts a single side surface 15 or 16 of construction box 10.

Figure 3:
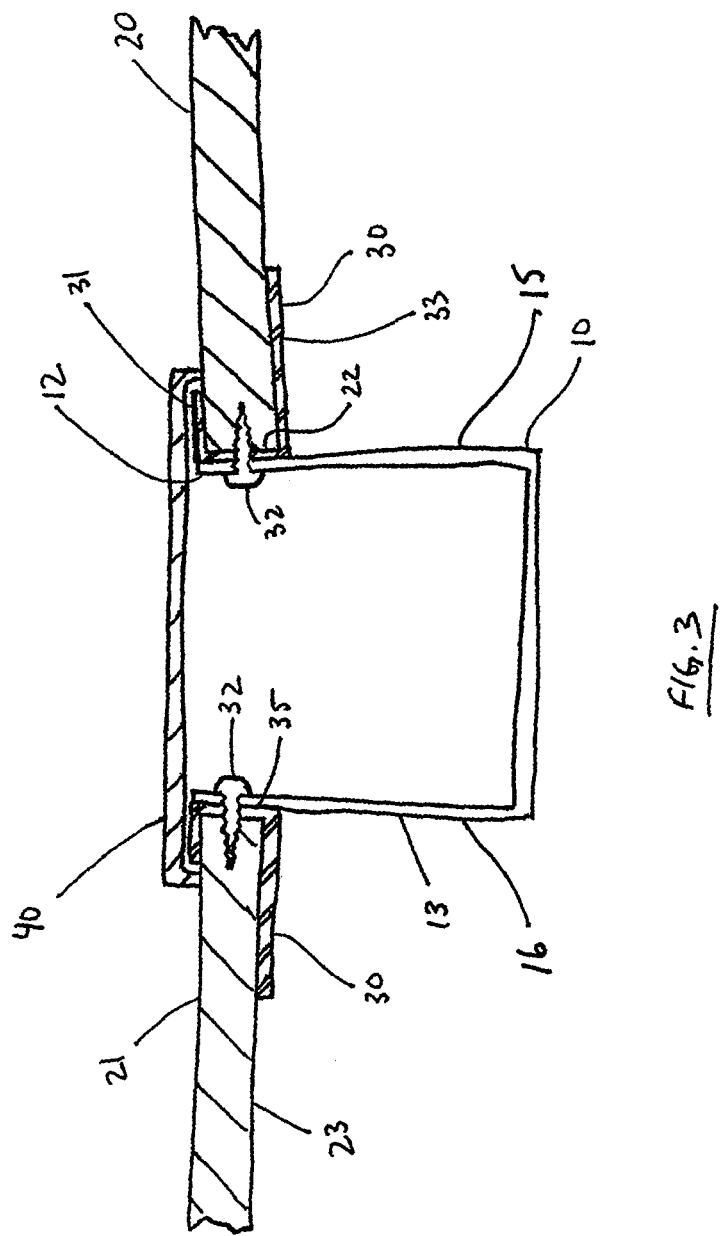
FIG. 3 is a cross-section top view of an installed old construction box in accordance with a representative embodiment of the present invention.
Figure 4:
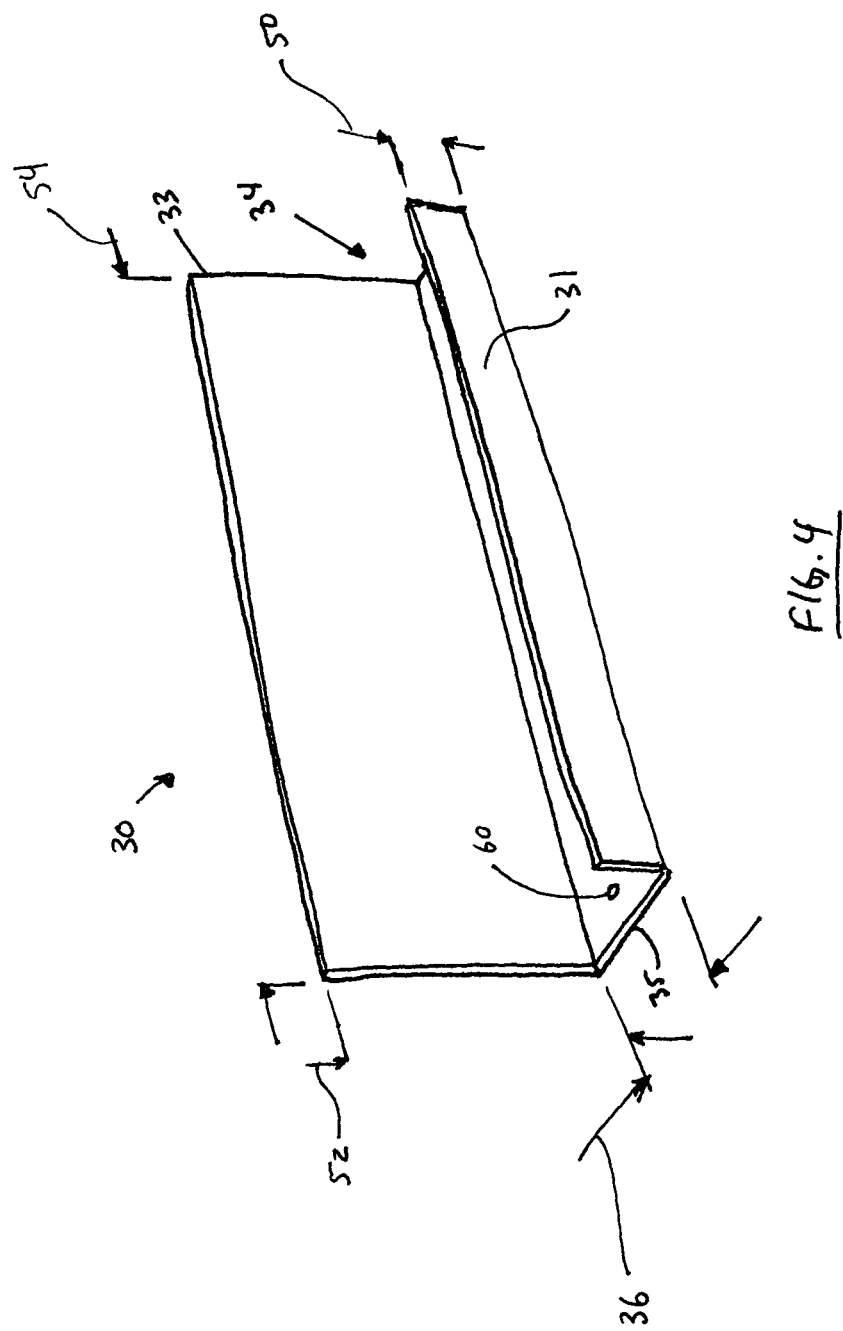
FIG. 4 is a perspective view of an adapter clip in accordance with a representative embodiment of the present invention.

In some embodiments, adapter clip 30 further comprises pilot holes 60 whereby to receive fasteners 32. Further, in some embodiments old construction box 10 further comprises pilot holes 62 whereby to receive fasteners 32. Thus, in some embodiments old construction box 10 is secured within opening 24 by aligning pilot holes 60 and 62 and threadedly inserting fasteners 32 through said pilot holes and into wall surface 20, as shown in FIGS. 1 and 3.

In some embodiments, the position of pilot holes 60 and 62 are determined by local code. In other embodiments, old construction box 10 comprises divots or physical markers in place of pilot holes. The divots or physical markers provide an indication of where to place fasteners 32 so as to secure construction box 10 in opening 24 in compliance with local codes.

In some embodiments, construction box 10 further comprises a knockout hole 70 whereby to secure a cable coupler or a flexible conduit. The flange-less design of construction box 10, or the absence of any flange or extension of construction box 10 external to perimeter 50 of opening 12 permits installation of the box within opening 24 following attachment of the flexible conduit to the box. Unlike traditional old construction boxes, the subsequent installation of construction box 10 and attached conduit line may be completed without damaging wall surface 20. Accordingly, once attached, the conduit and construction box 10 are inserted into opening 24 and positioned such that opening 12 of box 10 is flush with front flange 31 and exterior surface 21 of wall surface 20. Construction box 10 is then secured to wall 20 via fasteners 32.

In some embodiments, it is desirable to attach construction box 10 to a conduit line where the available length of conduit line is limited. Accordingly, in some embodiments construction box 10 is inserted entirely within opening 24, such that opening 12 of box 10 is positioned within the wall. Construction box 10 is then lowered within the wall such that knockout hole 70 is accessible via opening 24. The conduit line is then fastened to knockout hole 70 while construction box 10 is held within the wall. Following securement of the conduit line, construction box 10 positioned within opening 24 such that opening 12 of box 10 is flush with front flange 31 and exterior surface 21 of wall surface 20. Construction box 10 is then secured to wall 20 via fasteners 32.

Therefore, in some embodiments a method for installing old construction box 10 comprises: 1) providing an opening 24 in a wall surface 20; 2) fitting adapter clips 30 over an edge of opening 24; 3) positioning old construction box 10 within opening 24 such that an opening 12 of construction box 10 is approximately flush with an exterior surface 21 of wall surface 20; and 4) securing construction box 10 within opening 24 by driving fasteners 32 through construction box 10 and adapter clips 30 and into wall surface 20. Where a user desires to attach a conduit line, the method further includes the step of attaching the conduit line to a knockout hole 70 of construction box 10, as discussed above.

Further, in some embodiments a method for manufacturing an old construction box 10 comprises: 1) providing a construction box having an opening and an outer surface; 2) providing an adapter clip having a channel for receiving an edge surface of an opening in a finished wall surface, the adapter clip further having a base surface for forming an interface with the outer surface of the construction box; and 3) providing a fastener whereby to secure the construction box within an opening in a finished wall surface by driving the fastener through a portion of the construction box and the adapter clip, and into the edge surface of the opening in the finished wall surface.

Referring now to FIG. 5, in some embodiments old construction box 100 further comprises an external flange 110. External flange 110 is provided to prevent complete insertion of construction box 100 within opening 24 of wall surface 20. In some embodiments, external flange 110 is provided to assist a user in accurately positioning construction box 100 within opening 24.

In some embodiments, adapter clip 130 is modified to include a rabbeted surface 132 to compensate for the thickness of external flange 110. External flange 110 is seated within rabbeted surface 132 so that external flange 110 is approximately flush with the outer surface of front flange 131. Thus, adapter clip 130 and external flange 110 may be concealed with a cover plate 40 following installation of construction box 100.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps are disclosed herein, and without intending to publicly dedicate any patentable subject matter.

What is claimed is:

1. An old construction box system, comprising:
    a construction box having an opening, the construction box further having an outer surface comprising a top surface, a bottom surface, and a side surface;
    an adapter clip having a front flange, a rear flange and a base interposed therebetween, the front flange, the rear flange and the base forming a u-shaped channel for receiving an edge surface of an opening in a wall surface, the front flange being configured to wrap around a front surface of the wall surface and the rear flange being configured to wrap around a rear surface of the wall surface such that the edge surface of the opening is positioned within the u-shaped channel, a surface of the base that is opposite the u-shaped channel being further configured to form an interface with at least one of the top surface, the bottom surface, and the side surface of the outer surface of the construction box; and
    a fastener inserted though a surface of the construction box comprising the interface with the surface of the base that is opposite the u-shaped channel, and further inserted through the base of the adapter clip and anchored into the edge surface of the wall surface opening to secure the construction box and the adapter clip to the wall surface opening.

2. The system of claim 1, wherein the wall surface comprises at least one of a gypsum board material, a plaster material, a lathe and plaster material, a cement board material, a wood paneling material, a concrete material, a stucco coated wall surface, and combinations thereof.

3. The system of claim 1, wherein the adapter clip is configured to wrap around the portion of the wall surface opening.

4. The system of claim 1, wherein the portion of wall surface opening comprises a hole having a shape approximately equal to the outer surface of the construction box.

5. The system of claim 1, wherein the fasteners comprise at least one of a screw, a metal framing screw, a wood screw, and a sheet rock screw.

6. The system of claim 1, wherein the construction box comprises a low voltage mounting bracket.

7. The system of claim 1, wherein the construction box comprises at least one of metal, plastic, fiberglass, a composite material, and combinations thereof.

8. The system of claim 1, wherein the adapter clip comprises at least one of metal, plastic, fiberglass, a composite material, and combinations thereof.

9. A method for manufacturing a construction box for installation into a finished wall surface, comprising:
    providing a construction box having an opening and an outer surface comprising a top surface, a bottom surface, and side surfaces;
    providing an adapter clip having a channel for receiving an edge surface of the opening in the finished wall surface, the adapter clip having a front flange, a rear flange and a base interposed between therebetween, the front flange, the rear flange and the base forming a u-shaped channel and further having a base surface for forming an interface with at least one of the top surface, the bottom surface, and the side surface of the outer surface of the construction box; and
    providing a fastener whereby to secure the construction box within the opening in the finished wall surface by driving the fastener through a surface of the construction box comprising the interface with the surface that is opposite the u-shaped channel, and further driving the fastener through the base of the adapter clip and anchored into the edge surface of the opening in the finished wall surface.

10. The method of claim 9, further comprising the step of providing a cover plate, wherein a portion of the adapter clip is concealed by installing the cover plate.

11. The method of claim 9, further comprising the step of providing a knockout hole in a portion of the construction box, wherein the knockout hole is configured to receive a conduit line prior to positioning the construction box within the opening in the finished wall surface.

12. The method of claim 9, further comprising the step of providing a pilot hole in a portion of the construction box, wherein the pilot hole indicates placement of the fastener.

13. The method of claim 9, further comprising the step of providing a pilot hole in a portion of the adapter clip, wherein the pilot hole indicates placement of the fastener.

14. A flange-less construction box device, comprising:
    a construction box having an opening, the construction box further having an outer surface comprising a top surface, a bottom surface, and a side surface, the outer surface being flange-less;
    an adapter clip having a u-shaped channel for receiving an edge surface of a wall surface opening, the adapter clip having a front flange, a rear flange and a base interposed therebetween, the front flange being configured to wrap around a front surface of the wall surface and the rear flange being configured to wrap around a rear surface of the wall surface such that the edge surface of the opening is positioned within the u-shaped channel, a surface of the base that is opposite the u-shaped channel being configured to abut at least one of the top surface, the bottom surface, and the side surface of the outer surface of the construction box; and a fastener inserted through a surface of the construction box that abuts the surface of the base that is opposite the u-shaped channel, and further inserted through the base of the adapter clip and anchored into the edge surface of the wall surface opening.

15. The device of claim 14, wherein a width of the front flange is less than a width of the rear flange.

16. The device of claim 14, further comprising a divot formed in a portion of the construction box, wherein the divot indicates a desired placement of the fastener.

17. The device of claim 14, further comprising a pilot hole formed in a portion of the adapter clip, wherein the pilot hole is configured to receive the fastener.

* * * * *